Dec. 6, 1966  H. A. PETRAK  3,290,086
VEHICLE SEAT STRUCTURE
Filed June 11, 1964  2 Sheets-Sheet 1
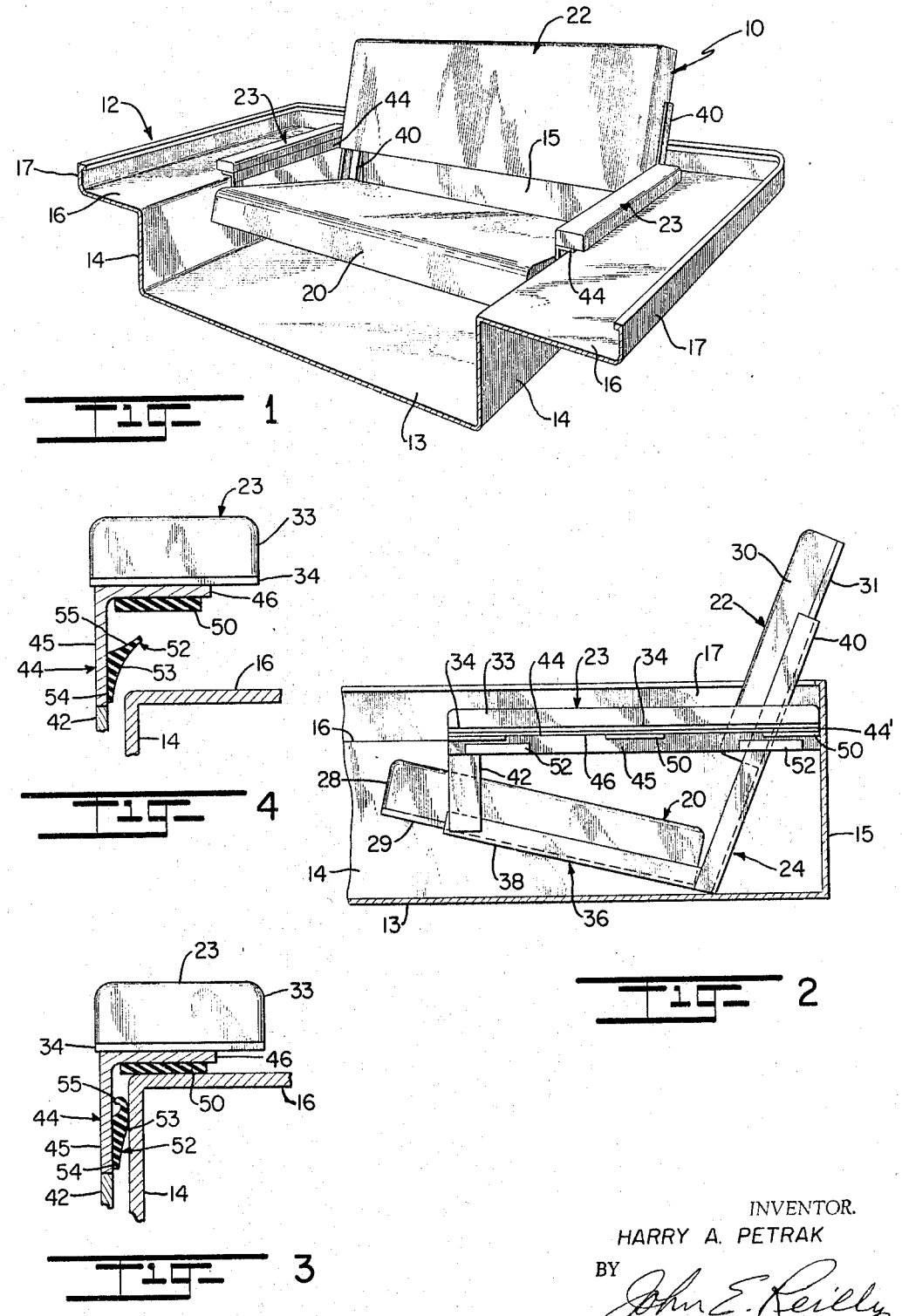
INVENTOR.
HARRY A. PETRAK
BY John E. Reilly
ATTORNEY Dec. 6, 1966   H. A. PETRAK   3,290,086

VEHICLE SEAT STRUCTURE

Filed June 11, 1964   2 Sheets-Sheet 2

INVENTOR.
HARRY A. PETRAK
BY
ATTORNEY

# United States Patent Office 3,290,086
Patented Dec. 6, 1966

3,290,086
VEHICLE SEAT STRUCTURE
Harry A. Petrak, 209 29th St., Boulder, Colo.
Filed June 11, 1964, Ser. No. 374,312
9 Claims. (Cl. 296—63)

This invention relates to a new and improved seat construction for motor vehicles, and more particularly relates to a vehicle seat for releasable disposition in a vehicle well or compartment of the type conventionally provided in over-the-road vehicles, the seat being so constructed and arranged that it can be securely positioned in place without positive attachment to the vehicle and can be easily removed, relocated, or reversibly positioned in the compartment.

It is a principal object of the present invention to provide an improved seat construction for vehicles which is versatile, rugged, and is so designed that it can be releasably but securely positioned in vehicle compartments or other limited areas, and in use will afford maximum head and leg room for an occupant together with maximum comfort and stability.

It is another object of the present invention to provide a frame assembly for a vehicle seat which is interchangeable for use in supporting and positioning vehicle seats of different widths and dimensions in a vehicle compartment and wherein the frame assembly incorporates a unique form of locking means to wedgingly secure the vehicle seat in a vehicle compartment against accidental tilting or shifting once in place.

It is a still further object of the present invention to provide for a vehicle seat which is formed of a minimum number of parts and can be installed without positive connection to the body frame or other parts of the vehicle, yet can be firmly locked or wedged in place and can be easily removed when not in use.

The above and other objects, advantages and features of the present invention will become more readily understood and appreciated from a consideration of the following detailed description when taken together with the accompanying drawings, in which:

FIGURE 1 is a perspective view illustrating a preferred form of vehicle seat positioned in place within a conventional vehicle compartment.

FIGURE 2 is a side view with parts broken away to illustrate in more detail the disposition and arrangement between the vehicle seat and vehicle compartment shown in FIGURE 1.

FIGURE 3 is a sectional view taken on line 3—3 of FIGURE 2 and illustrating in more detail a preferred form of releasable locking member for the vehicle seat.

FIGURE 4 is a sectional enlarged view of the preferred form of releasable locking member shown in FIGURE 3.

Figure 5:
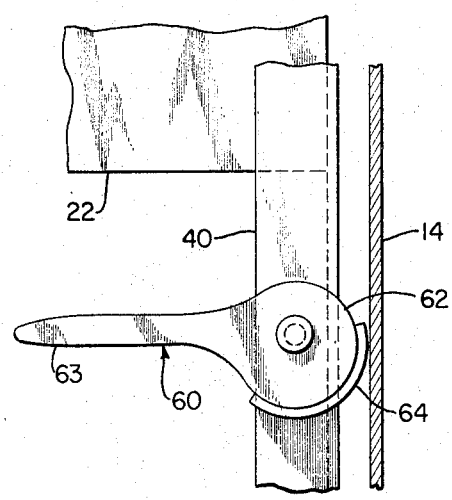
Figure 6:
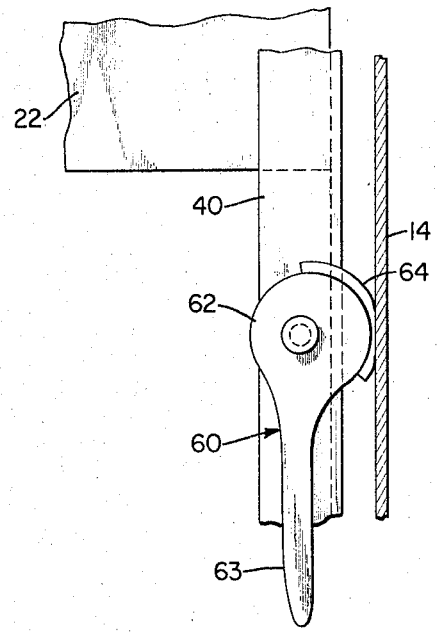
Figure 7:
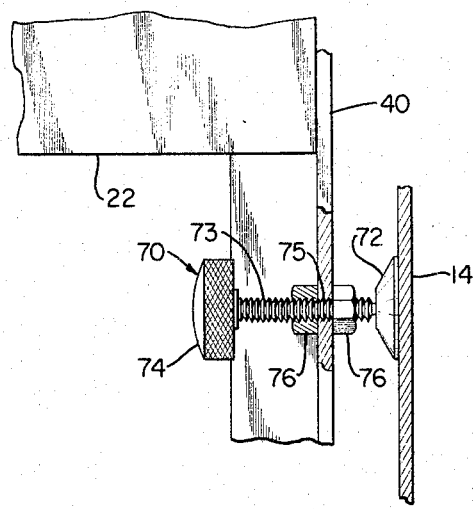

FIGURES 5 and 6 are enlarged views of a modified form of releasable locking member used between the vehicle seat and vehicle compartment for wedgingly locking the vehicle seat in place, FIGURE 5 illustrating locking member in released position and FIGURE 6 illustrating the member in locked disposition against one side of the vehicle compartment; and FIGURE 7 is a sectional view in detail of another modified form of releasable locking member conformable for use between the vehicle seat and vehicle compartment for releasably locking the vehicle seat in place.

Referring in detail to the drawings, there is shown by way of illustrative example in FIGURE 1 a preferred form of vehicle seat 10 positioned in a vehicle well or compartment represented generally at 12. The vehicle compartment shown is merely representative of various different types of compartments or interior storage spaces in many of the present-day motor vehicles, such as, the Willys "Jeep," International Harvester "Scout," and the Landrover. Or the compartment may be representative of a truck bed or other open storage area in a motor vehicle and which is conventionally designed for storing various items of equipment as well as for accommodating a vehicle seat when desired. Accordingly, it is desirable to provide for a vehicle seat which can be releasably positioned in a compartment of this type and in a way such that it can be rapidly but securely positioned in place and removed without necessity of bolting or otherwise fastening to the frame of the vehicle or to the vehicle compartment. By way of illustration and not limitation, the vehicle compartment may suitably consist of a flat horizontal bed 13, vertical side walls 14 which extend along opposite sides, a rear end wall 15 and top horizontal ledge portions 16 terminating in an outer rim 17. Again, the vehicle compartment may form an integral or unitary part of the vehicle itself and be firmly attached by suitable means within the vehicle. In turn the vehicle seat is designed such that it can be firmly wedged between opposed vertical side walls 14 of the compartment against accidental tilting, shifting, or other movement once positioned therein.

The vehicle seat 10 is broadly comprised of a seat cushion 20, a back cushion 22, arm rests 23, and a frame 24 uniting the arm rests, seat and back cushions in desired relation for mounting in the vehicle compartment. The arm rests, seat and back cushions are of conventional construction, and for example the seat cushion may suitably consist of a relatively thick pad 28 and a solid rigid backing member 29. Similarly, the back cushion 22 may be formed of a flexible pad 39 and backing member 31, and with the back and seat cushions each being of somewhat elongated rectangular configuration. The arm rests 23 also may consist of flexible pads 33 and rigid backings 34 for disposition along opposite sides of the seat and back cushions when in connected relation.

The frame 24 consists of correspondingly formed side frame assemblies 36, and like parts comprising each of the side frame assemblies are correspondingly enumerated in the drawings. In connected relation within a vehicle compartment it will be noted that each side frame assembly 36 is comprised of a lower, rearwardly inclined brace 38 for each side of the seat cushion, an upwardly and rearwardly inclining brace 40 for each side of the back cushion and with the lower end of the brace 40 being attached to the lower rearward end of seat brace 38. A relatively thick, vertical plate 42 extends upwardly from the forward end of the seat brace 38, and a horizontal brace 44 is attached to the upper end of the plate 42 and to the outer surface of the brace 40 for the purpose of supporting each arm rest 23 in desired relation to the seat and back cushions.

Each of the braces 38, 40 and 44 are preferably defined by angle irons and with the angle irons defining the braces 38 and 40 facing inwardly for attachment to the corner edges of the respective backing members for the seat and back cushions. However, the horizontal brace 44 faces outwardly with its vertical side 45 attached to the plate 42 and brace 40, and with its horizontal side 46 projecting outwardly over the ledge portion 16 so as to rest on the ledge portion and to suspend the seat within the compartment space. In addition, the backing member 34 for each arm rest is attached to the top surface of the horizontal side 46 and extends from the forward edge of the brace 46 to a point opposite the back cushion 22; and the brace has a rearward horizontal continuation 44' which extends beyond the point of attachment to the brace 40 and terminates below the upper edge of the back cushion 22 so as to form a means of horizontal support along each side of the seat from the forward edge of the seat cushion to the back edge of the back cushion 22.

In order to provide a rapid, secure means of securing the vehicle seat in place within the vehicle compartment, relatively flat, resilient pads 50 are attached along the undersurface of the horizontal side 46 of the brace 44 including the continuation 44', and wedges 52 are positioned at spaced intervals along the outer surface of the vertical side 45. The pads 50 and wedges 52 may be comprised of a rubber or rubber-like material and may either consist of single strips or of a series of strips spaced as intervals therelong as shown in FIGURE 2. Each wedge has a relatively thick intermediate portion 53 tapering downwardly into a portion 54 of reduced thickness and curving outwardly and somewhat upwardly into another portion 55 of reduced thickness. The vehicle seat is dimensioned in width so that as the seat is lowered into position, as best seen from FIGURE 4, the intermediate portion 53 of each wedge will initially engage the side wall 14, and under continued downward movement the upper reduced portion 55 will be compressed and doubled back upon itself into the relationship shown in FIGURE 3. In this way, any tendency of the seat to accidentally shift or raise out of the vehicle compartment will be resisted by the wedge portion 55 which will tend to move outwardly against the side wall under any lifting movement of the seat from the compartment. The pads 50 will cooperate with the wedges in resisting horizontal sliding or shifting movement of the seat along the ledge portion, and the horizontal braces 44 including their extensions 44' will cooperate with the wedges 52 to discourage tilting or tipping of the seat. At the same time, it is not necessary to adjust the wedges each time the vehicle seat is positioned in place; yet, the seat may be positively removed by lifting first one side then the other out of wedged engagement with the side walls 14.

A modified form of releasable securing or locking member 60 is shown in FIGURES 5 and 6 for use in combination with the vehicle seat shown in FIGURES 1 to 4, and in substitution for the wedges 52 employed in the preferred form of seat. In FIGURES 5 and 6 the releasable locking member 60 is pivotally attached to the back support brace 40 in spaced relation below the back cushion and has an off-center or eccentric cam 62 with a lever arm 63 and a rubber facing strip 64 on the outer surface of the cam. In this relation, when the seat is lowered into place in the compartment the locking member 60 is aligned opposite the side wall 14 in the position shown in FIGURE 5; and when the lever arm 63 is pivoted downwardly the eccentric portion of the cam 62 with the rubber facing 64 is forced into firm, wedging engagement with the side wall 14 as shown in FIGURE 6. By furnishing a member 60 on each of the braces below the back cushion member 22 and opposite the side walls, the members will cooperate in moving outwardly against opposite side walls to firmly wedge the seat in place and again without requiring positive attachment to the vehicle compartment. To remove the vehicle seat it is only necessary first to release the securing members by returning them to horizontal disposition as shown in FIGURE 5, after which the seat can be lifted out of the compartment.

Another modified form of locking member 70 is shown in FIGURE 7 which consists of a suction cup 72, a threaded stem 73, and knurled handle 74. The stem is threaded through an opening 75 in one side of each back brace 40 and by adjusting the stem within the opening will force the suction cup outwardly against the side wall 14. Again, the locking members 70 are positioned on each of the braces 40 to be aligned opposite the upper surface portion of the side walls 14. Once the seat is lowered into place, the stems are threaded outwardly to force the suction cups 72 against the side walls 14, whereupon the lock nuts 76 may be adjusted to lock the stem firmly in place within the threaded opening 75. The use of the locking members 70 is of particular advantage where there is substantial clearance between the sides of the vehicle seat and the side walls, or in other words will make the seats conformable for use where there is some variance in width of the compartment space. Otherwise, the different forms of locking members described have been found to be equally effective in wedging the seat against shifting or accidental displacement once positioned in place, and all afford the advantage of eliminating special means of attachment to the side walls.

In use, it will be evident that the seat will fit into a limited space or area due to the relationship formed between the arm rests, seat and back cushions. As best seen in FIGURE 2, with the arm rests supported along the horizontal ledge portions, the seat will be inclined rearwardly and downwardly with the forward edge raised and the rearward edge lowered to about the level of the floor to afford sufficient leg room between the forward edge of the seat cushion and the floor, but at the same time lowering the body so that there will be sufficient head room. In this same relation the back cushion is in spaced relation above the seat cushion and is disposed at a rearwardly inclined obtuse angle to the seat cushion so as to afford maximum comfort. As a result, the seat cushion will not occupy as much horizontal space since the back and seat portions are inclined and since the back cushion will extend rearwardly over the rear end wall of the compartment. Moreover, the seat may be positioned so as to face in either direction in the vehicle or a pair of seats may be employed in opposite, facing relation while occupying a minimum of space and affording maximum comfort. By providing different types of releasable locking members according to the intended use of the vehicle seat, the seat construction is readily conformable for use in vehicles of different types and according to the space requirements and configuration of the compartment, especially along the area of engagement for the locking members. An additional advantage resides in the use of the side frame assemblies 36 which are interchangeable for use in supporting and positioning vehicle seats of different widths and lengths. Since the side frame assemblies are attached directly to the backing members for the seat and back cushions and due to the open-ended construction of the braces 38 and 40, the frame assemblies will permit a wide variation in width and length of the seat and back cushions without modification of the frame assemblies themselves and nevertheless will interconnect the seat and back cushions in desired relation for disposition in the vehicle compartment.

It is therefore to be understood from the foregoing that various modifications and changes may be made in the disposition and arrangement of parts comprising the present invention without departing from the spirit and scope thereof as defined by the appended claims.

What is claimed is:

1. In combination with a vehicle having a seat-receiving compartment therein provided with spaced vertical sides, a vehicle seat comprising seat and back members, side frame assemblies along opposite sides of said seat and back members for supporting said members in adjacent spaced relation to the vertical sides in said compartment with said seat member inclining downwardly and rearwardly and said back member inclining rearwardly and upwardly in spaced relation above said seat member, and compressible wedging strips disposed between said side frame assemblies and the vertical sides of said vehicle compartment for wedging said vehicle seat within said vehicle compartment.

2. The combination according to claim 1 wherein each of said wedging strips are attached to said side frame assemblies in outwardly facing relation to the vertical sides of said compartment and each strip tapering downwardly from a relatively thick upper wedge portion, said upper wedge portion being dimensioned to be compressed between said side frame assemblies and the vertical sides of said vehicle compartment.

3. The combination according to claim 2 wherein each upper wedge portion has an upwardly and outwardly extending extremity of reduced thickness being doubled back over the upper wedge portion upon moving into wedged engagement with a vertical side of said compartment.

4. In combination with a vehicle having a seat-receiving compartment provided with spaced opposed vertical sides terminating in top horizontal extending ledge portions, a vehicle seat comprising seat and back members, and arm rests along opposite sides of said members, side frame supporting means interconnecting said members including arm rest support means so constructed and arranged in relation to said side frame supporting means as to support said arm rests on said horizontal ledge portions with said seat member extending downwardly and rearwardly within said vehicle compartment in spaced relation below said arm rests and with said back member inclining upwardly and rearwardly therefrom, and wedge members in the form of horizontal strips composed of a rubber or rubber-like material between said side frame supporting means and the vertical sides for releasably securing said vehicle seat in place within said compartment.

5. The combination according to claim 4 wherein said arm rest supporting means for said side frame supporting means are defined by horizontal braces extending along opposite sides of said seat and back members, said braces having horizontal continuations thereof extending rearwardly past said back member.

6. The combination according to claim 5 wherein said braces defining said arm rest supporting means are in the form of angle irons each having a vertical side attached to said side frame supporting means and a horizontal side overlying one of said ledge portions, and said securing means including wedges interpositioned between the vertical side of each brace and the vertical sides of the compartment to wedgingly secure said vehicle seat between the vertical sides of the compartment.

7. In combination with a vehicle having a seat-receiving compartment provided with spaced opposed vertical sides terminating in top horizontally extending ledge portions, a vehicle seat comprising a seat cushioned member, a back cushioned member and arm rests along opposite sides of said vehicle seat, side frame assemblies interconnecting opposite sides of said seat, back and arm rests including arm rest supporting braces to support said arm rests on said horizontal ledge portions with said seat member extending downwardly and rearwardly within said vehicle compartment in spaced relation below said arm rests and with said back member inclining upwardly and rearwardly from the rearward edge of said seat member and at an obtuse angle thereto, and wedge members between said side frame assemblies and the vertical sides of said compartment for wedgingly securing said vehicle seat in place within said compartment.

8. In the combination according to claim 7, said wedge members being in the form of cam means pivotally secured to said side frame assemblies and being selectively movable outwardly into wedging engagement with the vertical sides of said compartment.

9. In the combination according to claim 7, said wedge members being defined by suction cups adjustably connected to said side frame assemblies and means for selectively moving said suction cups outwardly into engagement with the vertical sides of said compartment.

References Cited by the Examiner

UNITED STATES PATENTS

| | | | |
|---|---|---|---|
| 291,383 | 1/1884 | Moore | 296—63 |
| 602,125 | 4/1898 | Burrows | 297—217 |
| 630,724 | 8/1899 | Menzer | 296—65 |
| 1,103,315 | 7/1914 | Rogers | 296—63 |
| 2,568,832 | 9/1951 | Stone | 296—63 X |
| 2,681,098 | 6/1954 | Bijold | 296—63 |

FOREIGN PATENTS 426,750  4/1935  Great Britain.

BENJAMIN HERSH, *Primary Examiner.*

P. GOODMAN, *Assistant Examiner.*